United States Patent Office 3,642,938
Patented Feb. 15, 1972

3,642,938
STORAGE-STABLE, HEAT-CURABLE SOLUBLE AND FUSIBLE PRECONDENSATES BASED ON POLYEPOXIDE COMPOUNDS, ACID POLYESTERS AND ANHYDRIDE CURING AGENTS
Rolf Schmid, Reinach, Basel-Land, Friedrich Lohse, Allschwil, Willy Fisch, Binningen, and Hans Batzer, Arlesheim, Switzerland, assignors to Ciba Limited, Basel, Switzerland
No Drawing. Filed Aug. 4, 1969, Ser. No. 847,453
Claims priority, application Switzerland, Aug. 7, 1968, 11,848/68
Int. Cl. C08g 45/14
U.S. Cl. 260—835
16 Claims

ABSTRACT OF THE DISCLOSURE

Curable B-stage from (1) a polyepoxide with at least one carbocyclic or heterocyclic ring (for example Araldit CY 175, triglycidyl isocyanurate or casting resin F), (2) a polyester containing at least one carbocyclic or heterocyclic ring, with terminal carboxyl groups, with the ratio of the total chain members $Z_g$ to ring members $Z_r$ having to be 2 to 13, and with the chain possessing 2–10 recurring structural elements (for example polyesters from phthalic anhydride and ethylene glycol 11:10, or from succinic acid and 1,1-bis(hydroxymethyl)-cyclohexane 5:4) in amounts of 0.2–0.8 equivalent per 1 epoxide equivalent, and (3) a polycarboxylic acid anhydride containing a carbocyclic ring (phthalic anhydride, hexahydrophthalic anhydride) in an amount of 0.8–0.2 equivalent per 1 epoxide equivalent.

---

The B-stages are solid at room temperature, can be stored practically indefinitely at room temperature and can be cured without addition of curing agents at 100–200° C. to give moulded materials of high tensile strength. The B-stage is as a rule manufactured in situ on a substrate (fillers, glass fibre fabrics). Use especially for prepregs.

The epoxide resins cured with polycarboxylic acid anhydrides are generally distinguished by good mechanical strength and particularly good constancy of physical properties on lasting exposure to heat. For many end uses such as the manufacture of compression moulding compositions, solid single-component casting resins and adhesive resins, dry preimpregnated fabrics (so-called prepregs), fluidised bed sintering powders and the like, the systems cannot be used or can only be used with difficulty, since the resin-curing agent mixtures are already gelled in the solid state and show only a low storage stability or working life ("pot life") in the liquid or fused state.

It has been found that stable precondensates (B-stage) which are solid at room temperature and fusible when heated are obtained by reaction of (I) 1.0 equivalent of a polyepoxide compound containing at least one carbocyclic or heterocyclic ring; (II) 0.2 to 0.8 equivalent, preferably 0.3 to 0.55 equivalent, of an acid polyester containing alternating ring members, which additionally has to fulfill the particular structural pre-requisites defined below; and (III) 0.8 to 0.2 equivalent, preferably 0.7 to 0.45 equivalent, of a polycarboxylic acid anhydride containing at least one carbocyclic ring, with warming and where appropriate in the presence of a basic accelerator. These precondensates can be stored practically indefinitely at room temperature and can be cured on warming without further addition of curing agents within a relatively short time to give infusible shaped articles. Shaped articles thus obtained are distinguished by high mechanical strength and in particular especially surprisingly high tensile strength values up to more than 900 kg./cm.$^2$, such as have not hitherto been observed on unstretched crosslinked plastics.

The cured shaped articles are furthermore distinguished by good dielectric properties.

The subject of the present invention is thus storage-stable heat-curable soluble and fusible precondensates based on polyepoxide compounds, acid polyesters and anhydride curing agents, which are especially in the form of prepregs, compression moulding powders, sintering powders or single-component adhesives, suitable for the manufacture of shaped articles, laminates, coatings and adhesive bonds, and which are obtained by warming a mixture of (1) a polyepoxide compound with at least one carbocyclic or heterocyclic ring; (2) a polycarboxylic acid anhydride with at least one carbocyclic ring in an amount of 0.8 to 0.2 equivalent, preferably 0.7 to 0.45 equivalent, per 1 epoxide equivalent of the polyepoxide compound (1), and (3) an acid polyester containing carbocyclic or heterocyclic rings, of formula

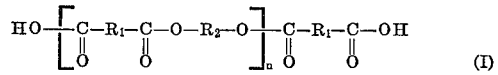
(I)

in amount of 0.2 to 0.8 equivalent, preferably 0.3 to 0.55 equivalent, per 1 epoxide equivalent of the polyepoxide compound (1), in the temperature range of 50° to 130° C., whilst avoiding gelling with, in Formula I, the symbols $R_1$ and $R_2$ denoting bivalent aliphatic, araliphatic, cycloaliphatic, cycloaliphatic-aliphatic, aromatic or heterocyclic residues, with at least one of the two residues $R_1$ and $R_2$ having to contain a carbocyclic or heterocyclic ring or ring system, with $n$ denoting an integer having a value of 2 to 10, prerably of 2 to 5, and with furthermore the quotient $Z_g/Z_r$ in the recurring structural element of formula

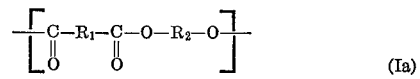
(Ia)

having a value of 2 to 13, preferably 4 to 10, with $Z_g$ denoting the total number of members in the straight chain of the structural element and $Z_r$ the number of members of the structural element consisting of a ring or ring system, and with the members mentioned being chosen from the following group:

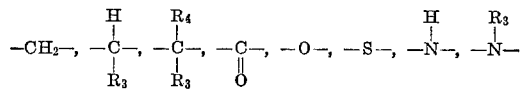

($R_3$ and $R_4$ each denote an alkyl group or alkenyl group), alicyclic, heterocyclic and aromatic rings or condensed or anellated ring systems, but with ring systems in which two rings are linked by a common spiro-carbon atom however being counted as two ring members.

Possible polyepoxide compound (1) are above all those which on curing with the polycarboxylic acid anhydride (2) alone yield a cured moulded material having a heat distortion point according to Martens DIN 53,458 of at least 90° C., and preferably of at least 140° C.

Possible polyepoxide compounds (1) are especially those with an alicyclic or cycloaliphatic or an N-heterocyclic ring or ring system. The heat-curable mixtures according to the invention which are derived from such polyepoxides are particularly advantageous for the manufacture of weathering resistant insulators since the shaped articles manufactured therefrom are resistant to tracking current discharges and subjection to electric arcs, that is to say do not form any conducting tracks.

Particularly suitable epoxide resins are those with at least one epoxide group present in an alicyclic five-membered or six-membered ring.

As cycloaliphatic polyepoxide compounds with at least one six-membered ring to which a 1,2-epoxide group is bonded there may be mentioned: limonene dioxide, vinylcyclohexene dioxide, cyclohexadiene dioxide;

bis(3,4-epoxycyclohexyl)dimethylmethane;
epoxycyclohexylmethyl-ethers of glycols or oxyalkyleneglycols such as diethylene glycol-bis(3,4-epoxy-6-methylcyclohexylmethyl)ether;
ethylene glycol-bis(3,4-epoxycyclohexylmethyl)ether,
  1,4 - butanediol-bis(3',4'-epoxycyclohexylmethyl)ether;
(3,4-epoxycyclohexylmethyl)glycidyl-ether;
(3,4-epoxycyclohexyl)glycidyl-ether, ethylene glycol-bis(3,4-epoxycyclohexyl)ether, 1,4-butanediol-bis-(3',4'-epoxycyclohexyl)ether, p-hydroxyphenyldimethylmethane-bis(3,4-epoxycyclohexyl)ether;
bis(3,4-epoxycyclohexyl)ether;
(3',4'-epoxycyclohexylmethyl)-3,4-epoxycyclohexyl-ether;
3,4-epoxycyclohexane-1,1-dimethanol-diglycidyl-ether.

Epoxycyclohexane-1,1-dicarboximides, such as

N,N'-ethylenediamine-bis(4,5-epoxycyclohexane-1,2-dicarboximide);
epoxycyclohexylmethyl-carbamates, such as bis(3,4-epoxycyclohexylmethyl)-1,3-toluylene-dicarbamate;
epoxycyclohexanecarboxylates of aliphatic polyols such as 3-methyl-1,5-pentanediol-bis(3'4'-epoxycyclohexanecarboxylate), 1,5-pentanediol-bis(3',4'-epoxycyclohexanecarboxylate), ethylene glycol-bis(3,4-epoxycyclohexanecarboxylate), 2,2-diethyl-1,3-propane diol-bis(3',4'-epoxycyclohexanecarboxylate), 1,6-hexanediol-bis(3',4'-epoxycyclohexanecarboxylate), 2-butene-1,4-diol-bis(3',4'-epoxycyclohexanecarboxylate), 2-butene-1,4-diol-bis(3',4'-epoxy-6'-methylcyclohexanecarboxylate), 1,1,1-trimethylolpropane-tris-(3',4'-epoxycyclohexanecarboxylate), 1,2,3-propanetriol-tris(3',4' - epoxycyclohexanecarboxylate);
epoxycyclohexanecarboxylates of oxyalkylene glycols such as diethylene glycol-bis(3,4-epoxy-6-methylcyclohexanecarboxylate), triethylene glycol-bis(3,4-epoxycyclohexanecarboxylate).

Epoxycyclohexylalkyl-dicarboxylic acid esters such as bis(3,4-epoxycyclohexylmethyl)maleate,
bis(3,4-epoxyclclohexylmethyl)oxalate,
bis(3,4-epoxycyclohexylmethyl)pimelate,
bis(3,4-epoxy-6-methylcyclohexylmethyl)succinate,
bis(3,4-epoxycyclohexylmethyl)adipate,
bis(3,4-epoxy-6-methylcyclohexylmethyl)adipate,
bis(3,4-epoxy-6-methylcyclohexylmethyl)sebacate,
bis(3,4-epoxycyclohexylmethyl)terephthalate,
bis(3,4-epoxy-6-methylcyclohexylmethyl)terephthalate.

Epoxycyclohexyl-carboxylic acid esters such as bis(3,4-epoxycyclohexyl)succinate,
bis(3,4-epoxycyclohexyl)adipate,
bis(3,4-epoxycyclohexyl)carbonate,
(3',4'-epoxycyclohexyl)-3,4-epoxycyclohexanecarboxylate,
3',4'-epoxycyclohexylmethyl-9,10-epoxystearate;
2',2''-sulphonyldiethanol-bis(3,4-epoxycyclohexanecarboxylate);
bis(3,4-epoxycyclohexylmethyl)carbonate.

Further, there may especially be mentioned the 3,4-epoxycyclohexanecarboxylates of 3,4 - epoxycyclohexylmethanols such as for example (3',4'-epoxy-2'-methylcyclohexylmethyl)-3,4-epoxy-2-methylcyclohexanecarboxylate,
(1'-chlor-3',4'-epoxycyclohexyl)-1-chlor-3,4-epoxycyclohexanecarboxylate,
(1'-brom-3',4'-epoxycyclohexylmethyl)-1-brom-3,4-epoxycyclohexanecarboxylate, and amongst those which are particularly suitable, for example those of the formula:

(=3',4'-epoxycyclohexylmethyl-3,4-epoxycyclohexane-carboxylate), (=3',4'-epoxy-6'-methylcyclohexylmethyl-3,4-epoxy-6-methylcyclohexanecarboxylate);

acetals and ketals with epoxycyclohexane groups, such as

3',4'-epoxy-6'-methylcyclohexanecarboxaldehyde-bis(3,4-epoxy-6-methylcyclohexylmethyl)acetal;
bis(3,4-epoxycyclohexylmethyl)formal,
bis(3,4-epoxy-6-methylcyclohexylmethyl)formal;
benzaldehyde-bis(3,4-epoxycyclohexylmethyl)acetal,
acetaldehyde-bis(3,4-epoxycyclohexylmethyl)acetal,
acetone-bis(3,4-epoxycyclohexylmethyl)ketal,
glyoxal-tetrakis-(3,4-epoxycyclohexylmethyl)acetal;
bis(3,4-epoxyhexanehydrobenzal)-D-sorbitol;
bis(3,4-epoxyhexanehydrobenzal)pentaerythritol,
[=3,9-bis(3,4-epoxycyclohexyl)spirobi(metadioxane)],
bis(3,4-epoxy-6-methyl-hexahydrobenzal)pentaerythritol;
3-(3',4'-epoxycyclohexylmethyl-oxyethyl)-2,4-dioxa-spiro-(5.5)-8,9-epoxyundecane,
3-(3',4'-epoxycyclohexylmethyloxy-(2')-propyl)-2,4-dioxaspiro(5.5)-8,9-epoxyundecane;
3,9-bis(3',4'-epoxycyclohexylmethyloxyethyl)spirobi (m-dioxane);
3-(2',3'-epoxypropyloxyethyl)-2,4-dioxaspiro(5.5)-8,9-epoxyundecane,
3-(glycidyloxyethoxyethyl)-2,4-dioxaspiro(5.5)-8,9-epoxyundecane;
ethylene glycol-bis-2'-(2,4-dioxaspiro(5.5)-8,9-epoxy-undecyl-3)ethyl-ether,
polyethylene glycol-bis-2'-(2,4-dioxaspiro(5.5)-8,9-epoxyundecyl-3)ethyl-ether,
1,4-butanediol-bis-2'-(2,4-dioxaspiro(5.5)-8,9-epoxy-undecyl-3)ethyl-ether,
trans-quinitol-bis-2'-(2,4-dioxaspiro(5.5)-8,9-epoxyundecyl-3)ethyl-ether,
bis(2,4-dioxaspiro(5.5)-8,9-epoxyundecyl-3)ether,
3,4-epoxyhexahydrobenzaldehyde(1'-glycidyloxy-glycerine-2',3')acetal.

Compounds which are particularly suitable are for example those of formulae (3-(3',4'-epoxycyclohexyl)-8,9-epoxy-2,4-dioxaspiro-(5.5)undecane)

and of formula (3-(3',4'-epoxy-6'-methylcyclohexyl)-8,9-epoxy-11-methyl-2,4-dioxaspiro(5.5)undecane).

The following may be mentioned as cycloaliphatic polyepoxide compounds with at least one five-membered ring to which a 1,2-epoxide group is bonded:

dicyclopentadiene diepoxide,
glycidyl-2,3-epoxycyclopentyl-ether,
bis(cyclopentenyl)ether diepoxide,
2',3'-epoxybutyl-2,3-epoxycyclopentyl-ether,
epoxypentyl-2,3-epoxycyclopentyl-ether,
9',10'-epoxystearyl-2,3-cyclopentyl-ether,
3',4'-epoxycyclohexylmethyl-2,3-cyclopentyl-ether,
2',2',5',5'-tetramethyl-3',4'-epoxycyclohexylmethyl-2,3-cyclopentyl-ether,
2',2',5',5',6'-pentamethyl-3',4'-epoxycyclohexylmethyl-2,3-epoxycyclopentyl-ether;
2,3-epoxycyclopentyl-9,10-epoxystearate,
2',3'-epoxycyclopentyl-3,4-epoxycyclohexylcarboxylate,
2',3'-epoxycyclopentyl-2,2,5,5-tetramethyl-3,4-epoxycyclohexylcarboxylate;
(3',4'-epoxy-2',5'-endomethylene-cyclohexylmethyl)-3,4-epoxy-2,5-endomethylene-cyclohexanecarboxylate,
bis(3,4-epoxy-2,5-endomethylene-cyclohexylmethyl) succinate;
bis(3,4-epoxy-2,5-endomethylene-cyclohexylmethyl) succinate;
bis(3,4-epoxy-2,5-endomethylene-cyclohexylmethyl) formal,
bis(3,4-epoxy-2,5-endomethylene-hexahydrobenzal) pentaerythritol,
3-(3',4'-epoxy-2',5'-endomethylene-cyclohexylmethyl)-9,10-epoxy-2,4-dioxaspiro(5.5)undecane;
bis(3-oxatricyclo[3.2.1.0$^{2,4}$]-oct-6-yl)carbonate,
bis(3-oxatricyclo[3.2.1.0$^{2,4}$]-oct-6-yl)succinate,
(3-oxatricyclo[3.2.1.0$^{2,4}$]oct-6-yl)-3,4-epoxy-cyclohexylcarboxylate,
(3-oxatricyclo[3.2.1.0$^{2,4}$]oct-6-yl)-9,10-epoxyoctadecanoate;

further, especially, epoxidised ethers and esters of dihydrodicyclopentadien-8-ol, such as (4-oxatetracyclo[6.2.1.0$^{2,7}$0$^{3,5}$]hendec-9-yl) glycidyl-ether,
(4-oxatetracyclo[6.2.1.0$^{2,7}$0$^{3,5}$]hendec-9-yl)-2,3-epoxybutyl-ether,
(4-oxatetracyclo[6.2.1.0$^{2,7}$0$^{3,5}$]hendec-9-yl)-6-methyl-3,4-epoxycyclohexylmethyl-ether,
(4-oxatetracyclo[6.2.1.0$^{2,7}$0$^{3,5}$]-hendec-9-yl]-3,4-epoxycyclohexyl-ether,
(4-oxatetracyclo-[6.2.1.0$^{2,7}$0$^{3,5}$]hendec-9-yl)-3-oxatricyclo(3.2.1.0$^{2,4}$)oct-6-yl-ether,
(4-oxatetracyclo[6.2.1.0$^{2,7}$0$^{3,5}$]hendec-9-yl)-3,4-epoxy-2,5-endomethylene-cyclohexylmethyl-ether;
ethylene glycol-bis(4-oxatetracyclo[6.2.1.0$^{2,7}$0$^{3,5}$]hendec-9-yl)ether,
diethylene glycol-bis(4-oxatetracyclo[6.2.1.0$^{2,7}$0$^{3,5}$]hendec-9-yl)ether,
1,3-propylene glycol-bis(4-oxatetracyclo[6.2.1.0$^{2,7}$0$^{3,5}$]hendec-9-yl)ether,
glycerine-bis(4-oxatetracyclo[6.2.1.0$^{2,7}$0$^{3,5}$]hendec-9-yl)ether;
bis(4-oxatetracyclo[6.2.1.0$^{2,7}$0$^{3,5}$]hendec-9-yl)ether;
bis(4-oxatetracyclo[6.2.1.0$^{2,7}$0$^{3,5}$]hendec-9-yl)formal;
bis(4-oxatetracyclo[6.2.1.0$^{2,7}$0$^{3,5}$]hendec-9-yl)succinate;
bis(4-oxatetracyclo[6.2.1.0$^{2,7}$0$^{3,5}$]hendec-9-yl)maleate;
bis(4-oxatetracyclo[6.2.1.0$^{2,7}$0$^{3,5}$]hendec-9-yl)phthalate;
bis(4-oxatetracyclo[6.2.1.0$^{2,7}$0$^{3,5}$]hendec-9-yl)adipate;
bis(4-oxatetracyclo[6.2.1.0$^{2,7}$0$^{3,5}$]hendec-9-yl)sebacate;
tris(4-oxatetracyclo[6.2.1.0$^{2,7}$0$^{3,5}$]hendec-9-yl) trimellitate,
9,10-epoxyoctadecane-acid[4-oxatetracyclo(6.2.1.0$^{2,7}$0$^{3,5}$)hendec-9-yl]ester and
9,10,12,13-diepoxyoctadecane-acid-(4-oxatetracyclo-[6.2.1.0$^{2,7}$0$^{3,5}$]hendec-9-yl)ester.

It is also possible to use mixtures of such cycloaliphatic epoxide resins.

As cycloaliphatic polyepoxide compounds which admittedly contain alicyclic ring systems but where the epoxide groups occur in alkyl side-chains (above all as glycidyl or β-methylglycidyl groups), the following may be mentioned: polyglycidyl esters of hydroaromatic polycarboxylic acids, for example Δ$^4$-tetrahydrophthalic acid diglycidyl ester, 4-methyl-Δ$^4$-tetrahydrophthalic acid diglycidyl ester, hexahydrophthalic acid diglycidyl ester and 4-methyl-hexahydrophthalic acid diglycidyl ester; further, diglycidyl-ethers or polyglycidyl-ethers and di- or poly-(β-methylglycidyl)ethers of aliphatic alcohols such as for example the diglycidyl-ethers or di-(β-methylglycidyl) ethers of 2,2-bis(4'-hydroxycyclohexyl)propane, 1,4-dihydroxycyclohexane (quinitol) or Δ$^3$-cyclohexene-1,1-dimethanol.

Possible polyepoxide compounds of the N-heterocyclic series are above all polyglycidyl compounds which contain a nitrogen-containing heterocyclic ring. One such compound is for example 1,3,5 - tris(β - glycidyloxypropionyl)hexahydro-s-triazine of formula

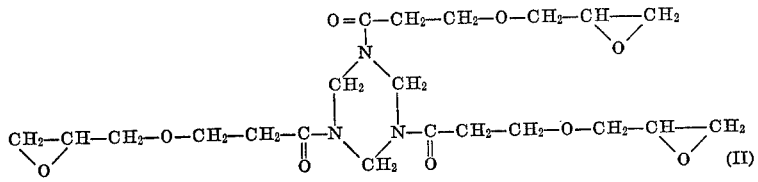

Preferably, polyglycidyl compounds of the N-heterocyclic series are employed in which the heterocyclic ring possesses the grouping

at least once, and where the glycidyl groups are directly linked to endocyclic nitrogen atoms. Such polyepoxides are conveniently accessible according to known methods by reaction of epichlorohydrin with heterocyclic urea derivatives such as, especially, cyanuric acid, ethyleneurea, hydantoin, substituted hydantoins, bis(hydantoin) compounds, uracil, substituted uracils or bis-(dihydrouracil) compounds in the presence of suitable catalysts, for example tertiary amines.

The following may be mentioned: the triglycidylisocyanurate of formula

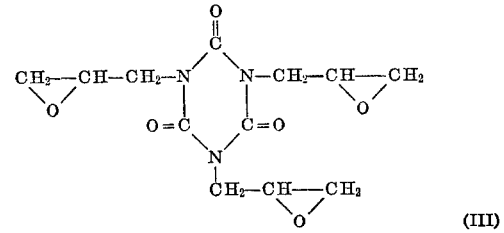

N,N' - diglycidyl - parabanic acid; N,N'-diglycidyl compounds of formula

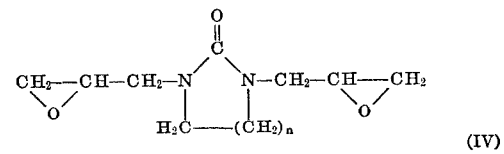

wherein n=1 or 2, that is to say N,N'-diglycidylpropyleneurea and above all N,N'-diglycidylethyleneurea (=1,3-diglycidylimidazolidone-2). N,N' - diglycidyl compounds of formula

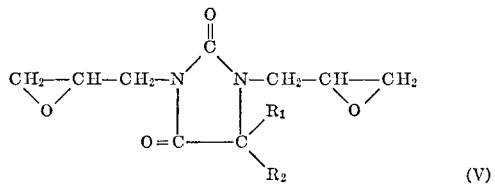

(V)

wherein $R_1$ and $R_2$ each denote a hydrogen atom or a lower alkyl residue with 1 to 4 carbon atoms, or wherein $R_1$ and $R_2$ together form a tetramethylene or pentamethylene residue; representatives of this class of compounds are for example 1,3-diglycidyl-hydantoin, 1,3-diglycidyl - 5-methyl-hydantoin, 1,3-diglycidyl-5-n-propyl-hydantoin and 1,3-diglycidyl-5-methyl-5-ethyl-hydantoin, 1,3 - diglycidyl-1,3-diaza-spiro(4.5)decane-2,4-dione, 1,3-diglycidyl - 1,3 - diazaspiro(4,4)nonane - 2,4-dione and especially 1,3-diglycidyl-5,5-dimethyl-hydantoin as well as 1,3-diglycidyl-5-isopropyl-hydantoin.

N,N'-diglycidyl compounds of formula

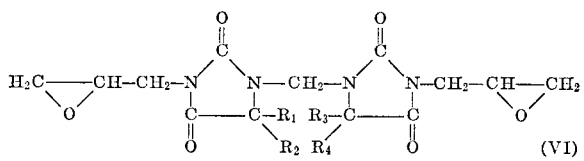

(VI)

wherein $R_1$, $R_2$, $R_3$ and $R_4$ each denote a hydrogen atom or a lower alkyl residue with 1 to 4 carbon atoms, or wherein $R_1$ and $R_2$ and/or $R_3$ and $R_4$ together form a tetramethylene or pentamethylene residue; representatives of this class of compounds are for example bis(3-glycidyl-5,5 - dimethylhydantoinyl - 1)methane, bis(3-glycidyl-5-methyl-5-ethylhydantoinyl-1)methane and bis(3-glycidyl-5-propylhydantoinyl-1)methane.

N,N'-diglycidyl compounds of formula

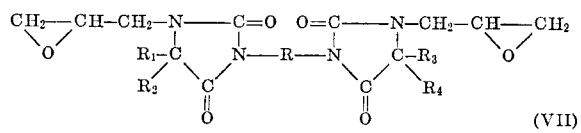

(VII)

wherein R is an aliphatic, cycloaliphatic or araliphatic residue and $R_1$, $R_2$, $R_3$ and $R_4$ each denote a hydrogen atom or a lower alkyl residue with 1 to 4 carbon atoms, or wherein $R_1$ and $R_2$ and/or $R_3$ and $R_4$ together form a tetramethylene or pentamethylene residue; representatives of this class of compound are for example bis(1-glycidyl-5,5 - dimethylhydantoinyl-3)methane, 1,2-bis(1'-glycidyl-5',5' - dimethylhydantoinyl-3')-ethane, 1,4-bis(1'-glycidyl-5',5' - dimethylhydantoinyl-3')-butane, 1,6-bis(1'-glycidyl-5',5'-dimethylhydantoinyl-3')-hexane, 1,12-bis(1'-glycidyl-5',5' - dimethylhydantoinyl-3')-dodecane, β,β'-bis(1'-glycidyl-5',5'-dimethylhydantoinyl-3')-diethyl-ether.

N,N'-diglycidyl compounds of formula

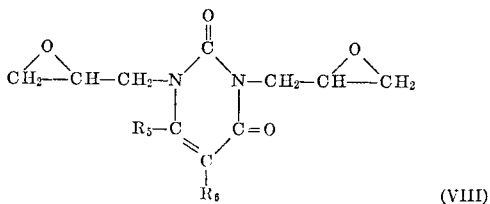

(VIII)

wherein $R_5$ and $R_6$ independently of one another each denote a hydrogen atom or a lower alkyl residue with 1 to 4 carbon atoms; representatives of this class of compound are for example 1,3-diglycidyluracil, 1,3-diglycidyl-6-methyluracil and 1,3-diglycidyl-5-methyluracil.

N,N'-diglycidyl compounds of formula

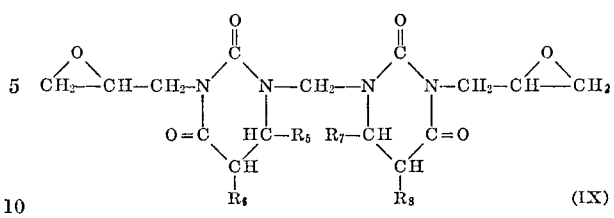

(IX)

wherein $R_5$, $R_6$, $R_7$ and $R_8$ independently of one another each denote a hydrogen atom or a lower alkyl residue with 1 to 4 carbon atoms; representatives of this class of compound are for example 1,1'-methylene-bis(3-glycidyl-5,6-dihydrouracil), and 1,1'-methylene-bis(3-glycidyl-6-methyl-5,6-dihydrouracil).

Of course mixtures of the cycloaliphatic and/or heterocyclic epoxide resins quoted above can also be used.

It is however also possible to use the known classes of polyepoxide compounds or epoxide resins which contain aromatic rings for the manufacture of the curable mixtures according to the invention, for example diglycidyl-ethers or polyglycidyl-ethers and di- or poly-(β-methylglycidyl)ethers of polyhydric phenols such as resorcinol, bis(p-hydroxyphenyl)methane, 2,2-bis(p-hydroxyphenyl)-propane (=bisphenol A or diomethane), 2,2-bis(4'-hydroxy-3'5'-dibromophenyl)propane, 1,1,2,2-tetrakis(p-hydroxyphenyl)ethane, or condensation products of phenols with formaldehyde obtained under acid conditions, such as phenol-novolacs and cresol-novolacs.

Polyglycidyl esters and poly(β-methylglycidyl)esters of polyhydric aromatic carboxylic acids such as phthalic acid, isophthalic acid, terephthalic acid, tetrachlorophthalic acid or trimellitic acid; N-glycidyl derivatives of aromatic amines such as N,N-diglycidyl-aniline, N,N-diglycidyltoluidine and N,N,N',N'-tetraglycidyl-bis(p-aminophenyl)methane.

However above all the advantageous electrical properties of the moulded materials manufactured with such B-stages based on aromatic polyepoxides are as a rule less pronounced than when using B-stages based on the cycloaliphatic or N-heterocyclic polyepoxide compounds mentioned earlier.

The polyesters of Formula I used for the manufacture of the B-stages according to the invention are acid polyesters with two terminal carboxyl groups. Such polyesters are obtained according to known methods by polycondensation of dicarboxylic acids of formula

HOOC—$R_1$—COOH with diols of formula HO—$R_2$—OH; depending on the chosen molar ratio of dicarboxylic acid and diol and on the completeness of the condensation reaction, polyesters of varying chain length are obtained. The chain of such polyesters is built up of the alternating building blocks of the dicarboxylic acid as well as of the alternating building blocks of the diol. The recurring structural element, that is to say the smallest recurring chemical grouping in the chain, is represented by the two building blocks from the dicarboxylic acid and from the diol linked by an ester bond, and has the formula

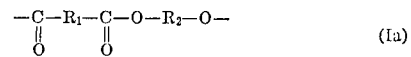

(Ia)

wherein $R_1$ denotes the residue of the dicarboxylic acid and $R_2$ the residue of the diol. At least one of the two building blocks of the structural element must contain a ring which may be alicyclic, heterocyclic or aromatic, or such a ring must occur at least once in the structural element (Ia). Further, the structural element has to fulfil the condition that the quotient $Z_g/Z_r$ is at least 2 and at most 13. $Z_g$ is the total number of members in the straight chain of the structural element (excluding side chains). The following are counted as individual members: methylene groups, methylene groups substituted by alkyl or alkenyl side chains, carbonyl, oxygen bridges, sulphur bridges, nitrogen bridges of amide groups, carbocyclic or heterocyclic rings or ring systems, for example a cyclohexane ring, cyclopentane ring, a 1,4-methylene-cyclohexane ring, a benzene ring, or a naphthalene ring are counted as a single member. The only exception are spiro-ring systems, for example the spiro(metadioxane) residue of formula:

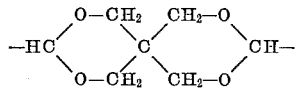

where the rings linked by the common spiro-carbon atom are counted as two members.

In order to obtain the sum $Z_g$, all members in the straight chain (that is to say including the ring members) are added. For the sum $Z_r$, only the ring members are added.

The condition for the quotient $Z_g/Z_r$ formulated above will be explained with the aid of the following table:

| Dicarboxylic acid | Diol | $Z_g$ | $Z_r$ | $Z_g/Z_r$ |
|---|---|---|---|---|
| Tetrahydrophthalic acid | Ethylene glycol | 7 | 1 | 7 |
| Phthalic acid | do | 7 | 1 | 7 |
| Do | Propane-1,2-diol | 7 | 1 | 7 |
| Hexahydrophthalic acid | Butanediol-1,4 | 9 | 1 | 9 |
| Phthalic acid | do | 9 | 1 | 9 |
| Hexahydrophthalic acid | Neopentyl glycol | 8 | 1 | 8 |
| Succinic acid | 1,1-bis(hydroxymethyl) cyclohexane | 9 | 1 | 9 |
| Tetrahydrophthalic acid | 1,1-bis(hydroxymethyl) cyclohexene-3 | 8 | 2 | 4 |
| Hexahydrophthalic acid | 2,2-bis(p-hydroxycyclohexyl)-propane | 8 | 3 | 2⅔ |

Thus the dicarboxylic acid and the diol for the synthesis of the acid polyester must be so chosen that the above conditions are fulfilled. Thus either the dicarboxylic acid or the diol or both must contain a ring, and furthermore the aliphatic polymethylene chain in aliphatic dicarboxylic acids or diols must not be too long. A polyester from phthalic acid and dodecanediol ($Z_g=17$, $Z_r=1$, $Z_g/Z_r=17$) is therefore unsuitable for the purposes of the purposes of the invention. Further, the molar ratio of the dicarboxylic acid and the dialcohol for the polycondensation must be so chosen that on average the recurring structural element (Ia) occurs at least twice and at most 10 times in the chain of the acid polyester (I), and that furthermore the resulting polyester has carboxyl groups at both ends of the chain. The following may be mentioned as dicarboxylic acids containing at least one ring which can serve for the synthesis of polyesters of Formula I: phthalic acid, isophthalic acid, terephthalic acid, tetrachlorophthalic acid, naphthalenedicarboxylic acid; Δ⁴-tetrahydrophthalic acid, hexahydrophthalic acid, 4 - methylhexahydrophthalic acid, 3,6 - endomethylene-Δ⁴-tetrahydrophthalic acid, 4-methyl-3,6-endomethylene-Δ⁴-tetrahydrophthalic acid, 3,4,5,6,7,7 - hexachlor - 3,6-endomethylene-Δ⁴-tetrahydrophthalic acid, diphenic acid, phenylenediacetic acid, hydroquinone-O,O'-diacetic acid, and diomethane-O,O'-diacetic acid.

To the extent that a diol containing at least one ring is chosen as a partner in the esterification, it is also possible to use non-cyclic dicarboxylic acids, for example oxalic acid, malonic acid, succinic acid, glutaric acid, adipic acid, allyl-succinic acid, dodecyl-succinic acid and dodecenyl-succinic acid.

The following may be mentioned as dialcohols containing at least one ring which can serve for the synthesis of the polyesters of Formula I: 1,1-, 1,2-, 1,3- and 1,4-bis-(hydroxymethyl)cyclohexane and the corresponding unsaturated cyclohexane derivatives, such as for example 1,1-bis(hydroxymethyl)cyclohexene-3 and 1,1-bis(hydroxymethyl)-2,5-methylene-cyclohexene - 3; hydrogenated diphenols such as cis-quinitol, trans-quinitol, resorcitol, 1,2-dihydroxycyclohexane, bis(4 - hydroxycyclohexyl)methane; 2,2 - bis - (4 - hydroxycyclohexyl)propane; tricyclo-(5.2.1.0²,⁶)-decane-3,9- or 4,8-diol; adducts of glycols to diallylidene-pentaerythritol, for example 3,9-bis(hydroxyethoxyethyl)spirobi(metadioxane) of formula

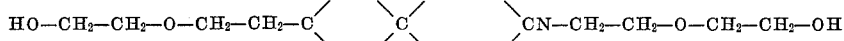

Diphenols such as hydroquinone, resorcinol, pyrocatechol or diomethane (=2,2-bis(p-hydroxyphenyl)propane) can also be employed as diols for the synthesis of the polyesters.

To the extent that a dicarboxylic acid containing at least one ring is chosen as a partner in the esterification, it is also possible to use non-cyclic diols, for example ethylene glycol, 1,2-propanediol, 1,3-propanediol, 1,4-butanediol, 1,5-pentanediol, neopentyl glycol, 1,6-hexanediol, hydroxypivalic acid neopentylglycol ester and 1,7-heptanediol. It follows from what has been stated above that long-chain dialcohols with for example more than 8 methylene groups may only be employed if the esterifying dicarboxylic acid contains an appropriate number of rings or more than one ring, so that the condition according to which $Z_g/Z_r$ must not become greater than 13 remains fulfilled. The same is also correspondingly true for the use of long-chain dicarboxylic acids with for example more than 8 methylene groups; in order that the condition for $Z_g/Z_r \leq 13$ shall be fulfilled, the diol must in such a case contain an appropriate number of rings.

It is of course also possible to use acid polyesters which are manufactured by condensation of a suitable dicarboxylic acid with a mixture of two or more suitable diols or conversely by condensation of a suitable diol with a mixture of two or more suitable dicarboxylic acids in the correct mutual stoichiometric quantity ratio. It is of course also possible to manufacture acid polyesters by condensation of mixtures of different dicarboxylic acids with mixtures of different diols, always provided that the conditions postulated above for the quotient $Z_g/Z_r$ and the total number of structural elements in the polyester chain remain observed.

Polycarboxylic acid anhydrides with at least one carbocyclic ring are used as anhydride curing agents (2). Such curing agents are for example cycloaliphatic polycarboxylic acid anhydrides such as Δ⁴-tetrahydrophthalic anhydride, 4-methyl-Δ⁴-tetrahydrophthalic anhydride, hexahydrophthalic anhydride, 4-methylhexahydrophthalic anhydride, 3,6-endomethylene-Δ⁴-tetrahydrophthalic anhydride (=nadicanhydride), 4-methyl-3,6-endomethylene - Δ⁴-tetrahydrophthalic anhydride (=methylnadicanhydride), 3, 4,5,6,7,7-hexachlor-3,6-endomethylene - Δ⁴ - tetrahydrophthalic anhydride (=chlorendic anhydride) and the Diels-Alder adduct from 2 mols of maleic anhydride and 1 mol of 1,4-bis(cyclopentadienyl)-2-butene, or aromatic polycarboxylic acid anhydrides such as phthalic anhydride, trimellitic anhydride or pyromellitic dianhydride.

The use of cycloaliphatic dicarboxylic acid anhydrides such as for example Δ⁴-tetrahydrophthalic anhydride or hexahydrophthalic anhydride, which yield moulded materials with particularly good electrical properties, is particularly advantageous.

The usual cure accelerators can optionally be conjointly used with the anhydride curing agent (2). Such accelerators are for example tertiary amines, their salts or quaternary ammonium compounds for example 2,4,6-tris(dimethylaminomethyl)phenol, benzyldimethylamine, 2-ethyl-4-methylimidazole, triamylamminoum phenolate, alkali metal alcoholates such as for example sodium methylate or sodium hexanetriolate; or tin^II salts of carboxylic acids such as tin^II octoate.

The manufacture of the solid fusible precondensates or B-stage according to the invention takes place by simple warming of the mixture of the components for its formation to 50–130° C.

These pre-adducts which are solid at room temperature are distinguished by a surprisingly good storage stability; even after 1–2 years the B-stages thus obtained are still fusible and soluble in suitable solvents. The B-stage can now be directly cured with warming, as a rule within the temperature range of 100–200° C., without the addition of further curing agents or accelerators, to give moulded materials or shaped articles.

The term "curing" as used here denotes a conversion of the above precondensates into insoluble and infusible crosslinked products, and in fact as a rule with simultaneous shaping to give shaped articles such as castings, compression moulded articles or laminates or to give two-dimensional structures such as lacquer films or adhesive bonds.

It is however also possible to dissolve the B-stage in a suitable solvent. Such lacquers are suitable for the manufacture of storage-stable fusible and curable adhesive films, pre-impregnated fabrics, lacquer films and the like.

The curable precondensates are above all employed in the fields of surface protection, the electrical industry and laminating processes. They can be used in a formulation in each case suited to the special end use, in the unfilled or filled state, optionally in the form of solutions, as stoving lacquers, sintering powders, compression moulding compositions, solid single-component casting resins, injection moulding formulations, impregnating resins and adhesives, tool resins, laminating resins, and potting and insulating compositions for the electrical industry.

Before curing, the single-component systems according to the invention may be mixed in any phase (that is to say before or after the manufacture of the B-stage) with the usual modifiers such as extenders, fillers and reinforcing agents, pigments, dyestuffs, organic solvents, plasticisers, flow control agents, agents for conferring thixotropy, flameproofing substances or mould release agents.

In order to manufacture storage-stable B-stages in the form of ready-to-use compression moulding compositions, sintering powders as single-component adhesives, the modifiers and fillers are appropriately mixed with the components for the formation of the B-stage and the reactive mixture of the reactive components [polyepoxide compound (1), polycarboxylic acid anhydride (2) and acid polyester (3)] and the inert substrates and modifiers are converted by warming into the curable single-component system containing the B-stage.

The mixtures can be manufactured in the usual manner with the aid of known mixing equipments (stirrers, kneaders, rolls and the like). If mixing devices which can be heated are used, the mixing and the formation of the B-stage can take place in a single operation.

The following may for example be mentioned as extenders, reinforcing agents, fillers and pigments which can be employed in the curable single-component systems according to the invention: textile fibres, glass fibres, asbestos fibres, boron fibres, carbon fibres, cellulose, polyethylene powder, polypropylene powder; quartz powder; mineral silicates such as mica, asbestos powder, slate powder, burnt kaolin, aluminium oxide trihydrate, chalk powder, gypsum, antimony trioxide, bentones, silica aerogel (Aerosil), lithopone, barytes, titanium dioxide, carbon black, graphite, oxide pigments such as iron oxide, or metal powders such as aluminium powder or iron powder.

Silicones, cellulose acetobutyrate, polyvinylbutyral, waxes, stearates and the like (which are in part also used as mould release agents) can be added as flow control agents when employing the curable mixtures, especially in surface protection.

A further particularly important field of use for the curable B-stages according to the invention are, furthermore, storage-stable impregnated webs, so-called pre-pregs, which are compression-moulded in a known manner, using pressure and heat, to give compression moulded laminated materials.

To manufacture the prepregs it is for example possible to impregnate porous two-dimensional structures such as woven fabrics, fibre mats or fibre fleeces, and in particular glass fibre mats or glass fibre woven fabrics, with solutions of the components for the formation of the B-stage in suitable organic solvents, such as for example toluene, xylene, n-propanol, butyl acetate, acetone, methyl ethyl ketone, diacetone-alcohol, ethylene glycol monomethyl ether, ethylene glycol monoethyl ether and ethylene glycol monobutyl ether, and to remove the solvent by a drying process and form the pre-adduct. It is however also possible to dissolve the storage-stable solid precondensate in a solvent, to impregnate the fabric web and to remove the solvent with warming and with adequate supply of fresh air, without gelling of the resin occurring. Advantageously, the carrier materials made of glass fibres can beforehand further be pretreated with suitable adhesion promoter solutions, such as silanes containing vinyl or methacryl groups, in order to improve the adhesion promotion.

The drying process is carried out at elevated temperature, at which the B-stage forms simultaneously with the removal of the solvent.

In the examples which follow the parts denote parts by weight and the percentages denote percentages by weight unless otherwise stated. The relationship of parts by volume to parts by weight is as of the millilitre to the gram.

The following acid polyesters were used for the manufacture of curable B-stages described in the examples:

MANUFACTURE OF POLYESTER A 760.6 g. of $\Delta^3$-tetrahydrophthalic anhydride and 248.5 g. of ethylene glycol (corresponding to a molar ratio of 5:4) were warmed to 175° C. under a nitrogen atmosphere. The mixture was further warmed to 210° C. over the course of 5 hours whilst stirring and the water resulting from the polycondensation was continuously distilled off. Thereafter the mixture was cooled to 157° C. and subjected to a vacuum at 10 mm. Hg for 30 minutes. The acid polyester was a very viscous golden yellow mass at room temperature, with an acid equivalent weight of 464 (theory: 468).

MANUFACTURE OF POLYESTER B 815 g. of phthalic anhydride and 310 g. of ethylene glycol (corresponding to a molar ratio of 11:10) were warmed to 164° C. under a nitrogen atmosphere. The mixture was further warmed to 185° C. over the course of 10 hours whilst stirring and the water forming in the polycondensation was continuously distilled off. Thereafter the mixture was cooled to 140° C. and a vacuum of 9 mm. Hg was applied. The mixture was warmed to 160° C. over the course of 7 hours in vacuo. The acid polyester was a yellow glassy brittle mass having an acid equivalent weight of 932 (theory: 1035).

MANUFACTURE OF POLYESTER C 740.5 g. of phthalic anhydride and 304 g. of propanediol-(1,2) (molar ratio 5:4) were warmed to 166° C. under a nitrogen atmosphere. The mixture was further warmed to 182° C. over the course of 6½ hours and the water forming in the polycondensation was continuously distilled off. Thereafter the mixture was cooled to 145° C. and kept under a vacuum of 9 mm. at this temperature. The polyester was a light yellow glassy brittle mass having an acid equivalent weight of 461 (theory: 486).

MANUFACTURE OF POLYESTER D 770.5 g. of hexahydrophthalic anhydride together with 360.5 g. of butanediol-1,4 (molar ratio 5:4) were warmed to 200° C. under a nitrogen atmosphere and kept at this temperature for 9 hours whilst stirring, with the water forming in the polycondensation being continuously distilled off. The mixture was subsequently cooled to 142° C. and subjected to a vacuum (11 mm. Hg), and warmed to 160° C. in vacuo over the course of 1 hour. The reaction product was a yellow mass of honey-like consistency and had an acid equivalent weight of 502 (theory: 530).

MANUFACTURE OF POLYESTER E 740.5 g. of phthalic anhydride and 360.5 g. of butanediol-1,4 (molar ratio 5:4) were warmed to 125° C. under a nitrogen atmosphere. The mixture was further warmed to 174° C. over the course of 7 hours and the water forming in the polycondensation was continuously distilled off. Thereafter the mixture was cooled to 132° C. and subjected to a vacuum down to 15 mm. Hg, warmed to 154° C. over the course of 1 hour and the pressure simultaneously lowered to 10 mm. Hg. The polyester was a brown viscous mass having an acid equivalent weight of 470 (theory: 514).

MANUFACTURE OF POLYESTER F 2158 g. of hexahydrophthalic anhydride and 946 g. of of butane-diol-1,4 (molar ratio 4:3) were warmed to 160° C. under a nitrogen atmosphere, then warmed to 190° C. over the course of 6 hours whilst stirring, and the water forming in the polycondensation was continuously distilled off. After a further 5 hours at 190° C. the mixture was cooled to 170° C., subjected to a vacuum of 12 mm. Hg, and warmed to 185° C. over the course of 1 hour under this vacuum. The acid polyester was a light yellow very highly viscous liquid with an acid equivalent weight of 452 (theory: 411).

MANUFACTURE OF POLYESTER G 616 g. (4 mols) of hexahydrophthalic anhydride and 312 g. (3 mols) of neopentylglycol were mixed in a sulphonation flask provided with a descending condenser and heated to 100° C. In the course of this an exothermic reaction started (temperature rise to 186° C.). The reaction mixture was then cooled to 150° C. and allowed to react at this temperature for 20 hours under nitrogen. The elimination of water was then complete. The mixture was subsequently allowed to react for a further 8 hours at 150° C. under a water-jet vacuum, whereby a light yellow acid polyester, solidifying to a glass at room temperature and having an acid equivalent weight of 420 (theory: 446) was obtained.

MANUFACTURE OF POLYESTER H 590 g. (5 mols) of succinic acid and 576 g. (4 mols) of 1,1-bis-(hydroxymethyl)-cyclohexane were mixed in a sulphonation flask provided with a descending condenser and heated to 130° C. under nitrogen. In the course of this an exothermic reaction started and the reaction mixture rose to 170° C. The mixture was then allowed to react for 4 hours at 170° C., 3 hours at 190° C. under normal pressure and 2 hours at 175° C. under a waterjet vacuum. A light yellow highly viscous resin with an acid equivalent weight of 533 (theory: 511) resulted.

MANUFACTURE OF POLYESTER I 760.8 g. (5 mols) of tetrahydrophthalic anhydride and 568.8 g. (4 mols) of 1,1 - bis - (hydroxymethyl)cyclohexene-3 were heated for 16 hours to 180° C. under nitrogen in a sulphonation flask provided with a descending condenser, whilst stirring. The elimination of water was then complete. Thereafter the mixture was allowed to react for a further 6 hours at 180° C. under a water-jet vacuum. A light yellow acid polyester solidifying to a glass at room temperature and having an acid equivalent weight of 901 was thereby obtained.

MANUFACTURE OF POLYESTER J 493.2 g. (3.2 mols) of hexahydrophthalic anhydride were mixed with 576.0 g. (2.4 mols) of hydrogenated bisphenol A (2,2 - bis - (p-hydroxycyclohexyl)propane) [corresponding to a molar ratio of anhydride to diol of 4:3] and heated to 170° C. under nitrogen and whilst stirring. The temperature was then raised to 180° C. over the course of 4 hours and to 200° C. over the course of a further 24 hours. For the last 3 hours of the reaction time the mixture was allowed to react under a water-jet vacuum. The resulting polyester at room temperature is a glassy product having an acid equivalent weight of 620 (theory 641).

EXAMPLES OF MANUFACTURE

Example 1

(a) 161 g. of the cycloaliphatic diepoxide compound of formula

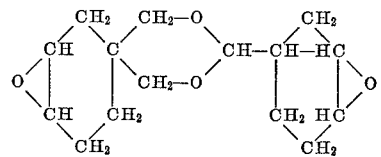

(=3,4-epoxytetrahydrozbenzal - 3',4' - epoxycyclohexane-1,1'-dimethanol), which is liquid at room temperature and has an epoxide content of 6.2 epoxide equivalents/kg. (=epoxide resin A) were warmed to 110° C. with 210 g. of polyester A and 77 g. of hexahydrophthalic anhydride, corresponding to 0.5 mol of anhydride and 0.45 equivalent of acid ester per 1.0 equivalent of diepoxide compound, and after adding 3 g. of 2-ethyl-4-methylimidazole the mixture was well stirred.

The resulting homogeneous mixture (451 g.) was kept at 100° C. for 10 minutes and then poured on to a cold metal sheet. The pre-adduct was a yellow hard glassy mass having a melting point of 39° C. The gel time had the following values after the indicated periods of storage at room temperature:

16 hours: 63 seconds, melting point=39° C.
3 days: 65 seconds
21 days: 65 seconds
78 days: 89 seconds, melting point=40° C.

The pre-adduct is practically unchanged in respect of reactivity gel time and melting point.

In a further experiment, the homogeneous mixture of epoxide resin A, polyester A, anhydride curing agent and accelerator manufactured above was subjected to a heat treatment at 110° C. and after staggered intervals of time the glass temperatures of the resulting condensation products were measured on samples using a differential scanning calorimeter.

After 20 minutes the glass transition range was between 47 and 66° C., after 35 minutes between 88 and 115° C., whilst gelling only occurred after 90 minutes.

A comparison experiment was carried out with a known mixture of analogous composition but without the addition of polyester (1.0 equivalent of epoxide resin A and 1.0 mol of hexahydrophthalic anhydride). At the gel point the glass temperature of the crosslinked known mixture was below room temperature. The manufacture of a stable, solid and fusible B-stage is accordingly only possible for the resin mixture according to the invention.

(b) A homogeneous mixture was manufgactured using 0.6 mol of hexahydrophthalic anhydride (instead of 0.5) and 0.4 equivalent of polyester A (instead of 0.45) and otherwise the same composition, by fusing the components together at 110° C. 442 g. of the resulting homogeneous mixture were warmed to 100° C. for 25 minutes and then poured out on a cold metal sheet. The hard and glassy pre-adduct which was solid at room temperature could be melted on warming and showed the following gel times at 200° C.:

after 2 hours: 146 seconds
after 6 days, 20° C.: 141 seconds
after 40 days, 20° C.: 135 seconds, melting point=48° C.

Example 2

101.5 g. of triglycidyl isocyanurate with an epoxide content of 9.85 epoxide equivalents/kg. (=epoxide resin B) were warmed with 186 g. of polyester A until a homogeneous melt formed on stirring. After adding 92.5 g. of hexahydrophthalic anhydride (corresponding to 0.6 mol of anhydride and 0.4 equivalent of acid polyester per 1.0 equivalent of epoxide compound) the mixture was well stirred at 110° C.

The resulting homogeneous mixture was warmed to 100° C. over the course of 40 minutes and then immediately cooled to room temperature. The B-stage manufactured in this way was dry and hard at room temperature. The following gel times at 200° C. were measured:

after 2 hours: 28 seconds
after 6 days: 29 seconds
after 40 days: 28 seconds

Example 3

161 g. (1.0 equivalent) of epoxide resin A were warmed with 226 g. (0.45 equivalent) of polyester D and 77 g. (0.5 equivalent) of hexahydrophthalic anhydride to 100° C. and well mixed after adding 3 g. of 2-ethyl-4-methylimidazole.

The resulting homogeneous mixture was warmed at 100° C. for 17 minutes. A resin which was solid at room temperature, non-tacky and fusible at elevated temperature was obtained. After storage at room temperature the following gel times at 200° C. were found:

after 4 days: 97 seconds
after 14 days: 95 seconds
after 76 days: 100 seconds

Example 4

(a) 161 g. (1.0 equivalent) of epoxide resin A were warmed to 110° C. with 184 g. (0.4 equivalent) of polyester F, 77 g. (0.5 equivalent) of hexahydrophthalic anhydride and 3 g. of 2-ethyl-4-methylimidazole and well mixed. The resulting homogeneous melt was warmed to 100° C. over the course of 55 minutes and rapidly cooled. The non-tacky light yellow and fusible B-stage thus obtained showed the following gel times at 200° C. after storage at room temperature:

after 4 days: 81 seconds
after 14 days: 87 seconds
after 76 days: 100 seconds

The melting point was 50° C. after 76 days storage at room temperature.

(b) A homogeneous melt was manufactured using 0.6 equivalent of anhydride and 0.4 equivalent of acid polyester (instead of 0.5 and 0.45 equivalent) and otherwise the same composition and processing as in Example 4(a). 100 g. of the resulting mixture were warmed to 100° C. over the course of 70 minutes and rapidly cooled by pouring out onto a metal sheet. The B-stage thus obtained was glassy, hard and fusible at room temperature and showed the following gel times at 200° C. after storage at room temperature:

after 2 hours: 100 seconds
after 6 days: 105 seconds

The melting point after 40 days storage at room temperature was 46° C.

Example 5

161 g. (=1.0 equivalent) of epoxide resin A were well mixed at 110° C. with 187 g. (=0.35 equivalent) of polyester H, 92.5 g. (=0.6 equivalent) of hexahydrophthalic anhydride and 3 g. of 2-ethyl-4-methylimidazole. The resulting homogeneous mixture was warmed to 100° C. over the course of 55 minutes and then rapidly cooled. The B-stage manufactured in this way was of a glassy hardness at room temperature and had a melting point at 50° C. After 78 days storage at room temperature a melting point of 49° C. was measured. The gel time of the resin at 200° C. had the following values after the indicated period of storage at room temperature:

16 hours: 43 seconds
6 days: 56 seconds
78 days: 69 seconds

Example 6

161 g. (1.0 equivalent) of epoxide resin A were warmed to 100° C. with 92.5 g. of hexahydrophthalic anhydride (0.6 equivalent) and 373 g. of polyester B (0.4 equivalent) and after adding 0.3 g. of dimethylbenzylamine the mixture was stirred for 20 minutes at this temperature. The mixture was rapidly cooled by pouring out onto a metal sheet. A coulourless mass of glass-like hardness was obtained, which could be ground but was still fusible and curable on warming. The gel time of the powdered resin was 12 minutes at 180° C. after 10 days' storage at room temperature.

Example 7

192 g. (1.0 equivalent) of the N-glycidyl compound of the following formula

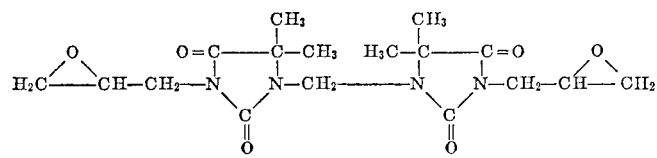

with an epoxide content of 5.2 epoxide equivalents/kg. (epoxide resin C) were warmed to 130° C. with 92.5 g. of hexahydrophthalic anhydride (0.6 equivalent) and 184.4 g. (0.4 equivalent) of polyester C. After adding 0.39 g. of dimethylbenzylamine the mixture was stirred at this temperature and at regular time intervals a small sample was taken and cooled to room temperature. After 35 minutes a mass of glass-like hardness was obtained on cooling a sample. The mix was immediately poured onto a metal sheet and rapidly cooled. A mass of glass-like hardness at room temperature and having a very slight yellowish colour was obtained. The mass was still easily fusible after 20 days storage at room temperature and had a gel time of 300 minutes at 180° C.

Example 8

101.5 g. (1.0 equivalent) of epoxide resin B were warmed to 100° C. with 92.5 g. (0.6 equivalent) of hexahydrophthalic anhydride and 235 g. (0.5 equivalent) of polyester E and stirred at this temperature. The course of the reaction of the mixture was checked as in Example 7. After 65 minutes the reaction mixture was poured out onto a metal sheet. A practically colourless mass which was hard at room temperature and fusible and curable on warming was obtained. After 20 days storage at room temperature the powdered mass had a gel time of 23 seconds at 180° C.

Example 9

141 g. (1.0 equivalent) of the epoxide compound of the following formula $$\text{epoxide resin D structure}$$

having an epoxide content of 7.1 epoxide equivalents per kg. (epoxide resin D) were warmed to 130° C. with 107 g. (0.6 equivalent) of methylnadicanhydride and 210 g. of polyester G. After adding 0.3 g. of dimethylbenzylamine the reaction mixture was stirred for 130 minutes at this temperature and poured out onto a metal sheet. A practically colourless reaction product which was hard at room temperature and still fusible on warming was obtained. After 5 days storage at room temperature a gel time of 205 seconds at 180° C. was measured; after 16 days storage at room temperature the gel time of the powdered mass was 180 seconds at 180° C.

Example 10

185 g. (1.0 equivalent) of diomethane-diglycidyl-ether having an epoxide content of 5.4 epoxide equivalents per kg. (epoxide resin E) were warmed to 100° C. with 92.5 g. (0.6 equivalent) of hexahydrophthalic anhydride and 360 g. (0.4 equivalent) of polyester I and after adding 0.4 g. of dimethylbenzylamine the mixture was stirred at this temperature and the course of the reaction checked in accordance with Example 7. After 100 minutes the reaction mixture was poured out onto a metal sheet and cooled. The product, which was hard and colourless at room temperature, was fusible on warming and showed a gel time of 630 seconds at 180° C. after 14 days storage at room temperature.

Example 11

159 g. (1.0 equivalent) of hexahydrophthalic acid diglycidyl ester having an epoxide content of 6.3 epoxide equivalents per kg. (epoxide resin F) were warmed to 100° C. with 89 g. (0.6 equivalent) of phthalic anhydride and 450 g. (0.5 equivalent) of polyester I and kept for 50 minutes at this temperature whilst stirring. After pouring out onto a metal sheet and rapid cooling, a hard almost colourless mass which was fusible on warming was obtained. After 4 days storage at room temperature the product had a gel time of 50 seconds at 180° C.; after 25 days storage at room temperature the product was still easily fusible and had a gel time of 200 seconds at 180° C.

Example 12

155 g. (1.0 equivalent) of $\Delta^4$-tetrahydrophthalic acid diglycidyl ester having an epoxide content of 6.45 epoxide equivalents per kg. (epoxide resin G) were warmed to 100° C. with 92.5 g. (0.6 equivalent) of hexahydrophthalic anhydride and 248 g. (0.4 equivalent) of polyester J and stirred for a further 5 minutes after adding 0.3 g. of dimethylbenzylamine. The mixture was poured out onto a metal sheet and rapidly cooled. The hard powdered product was fusible on warming and had a gel time of 10 seconds at 180° C. after 10 days storage at room temperature. After 30 days storage at room temperature the gel time was 30 seconds at 180° C.

Example 13

192 g. (1.0 equivalent) of epoxide resin C were stirred for 16 hours at 140° C. with 92.5 g. (0.6 equivalent) of hexahydrophthalic anhydride and 170 g. (0.4 equivalent) of polyester A, and the reaction mixture was cooled by pouring out onto a metal sheet. A mass of glass-like hardness was obtained which after 10 days storage at room temperature showed a gel time of 17 minutes at 180° C.

Example 14

264 g. (0.6 equivalent) of 3,4,5,6,7,7-hexachlor-3,6-endomethylene - $\Delta^4$ - tetrahydrophthalic anhydride were warmed to 140° C. with 170 g. (0.4 equivalent) of polyester A and stirred until a homogeneous solution was formed. Thereafter 192 g. (1.0 equivalent) of epoxide resin C were added to this mixture at this temperature, and the reaction mixture was stirred until a homogeneous solution was formed and rapidly cooled by pouring out onto a metal sheet. A hard product which was fusible on warming and had a gel time of 110 seconds at 180° C. after 8 days storage at room temperature was obtained.

Example 15

159.5 g. (1.0 equivalent) of hexahydrophthalic acid di-($\beta$-methylglycidyl)ester having an epoxide content of 6.3 epoxide equivalents per kg. (epoxide resin H) were warmed to 140° C. with 92.5 g. (0.6 equivalent) of hexahydrophthalic anhydride and 248 g. (0.4 equivalent) of polyester K and stirred for 28 minutes at this temperature. The reaction mixture was then rapidly cooled by pouring out onto a metal sheet. The product which was hard at room temperature, was fusible on warming and had a gel time of 29 minutes at 180° C.

USE EXAMPLES

Example I (Manufacture of a glass fibre laminate)

1860 g. of polyester A are warmed to 60° C. with 1000 g. of butyl acetate and the mixture is stirred until everything has dissolved. 1610 g. of epoxide resin A are then added and the mixture again stirred until it has become homogeneous. After cooling to about 30° C. 925 g. of hexahydrophthalic anhydride and 30 g. of a 6% strength solution of the sodium alcoholate of 3-hydroxymethyl-2,4-dihydroxypentane ("sodium hexylate") in 3-hydroxymethyl-2,4 - dihydroxypentane ("hexanetriol") are added and the solution is diluted by adding methyl ethyl ketone to a viscosity of 25 seconds flow time at 25° C. in a DIN cup (DIN 53,211).

A woven glass fabric of 200 g./m.$^2$ area weight with a linen binding, which was treated with an ammoniacal solution of a chromium chloride-methacrylate complex (registered trade name Volan A) in order to improve the adhesion promotion to the resin, is impregnated with the above resin solution by the dipping process and subsequently dried for 10 minutes at 140–150° C. in a stream of hot air. A dry prepreg containing 42.5% of resin is produced. The prepregs are cut and stacked into a bundle and pressed for 120 minutes at 150° C. at a pressure of 20 kg./m.$^2$. A tough and hard laminate (resin content 32%) is produced, which shows the following properties:

dielectric loss factor tg $\delta$ (50 Hz.)
at—
    25° C.=0.002
    40° C.=0.003
    60° C.=0.006
    80° C.=0.017
    120° C.=0.034
    150° C.=0.047 flexural strength according to VSM 77,103=47.6 kg./mm.$^2$
flexural strength after 1 hour's storage in water, 100° C. (measured at 25° C.)=45.2 kg./mm.$^2$
impact strength, VSM 77,105=110 cm. kg./cm.$^2$
boiling water absorption after 1 hour, 100° C.=0.58%

Example II

The precondensate (B-stage) manufactured in Example 7 was dissolved in methyl ethyl ketone to give a 16% strength solution and applied to an iron sheet. After a heat treatment of 16 hours at 140° C. a hard, scratchresistant, colourless coating of high gloss was produced, which adhered excellently to the substrate. Iron sheets were treated in the same manner with solutions of the precondensates manufactured in Examples 6, 8, 9 and 12. All coatings were colourless and were distinguished by high gloss, high hardness and good adhesion to the metal.

Example III (a) The precondensate (B-stage) manufactured in Example 9 was dissolved in a mixture consisting of equal parts by weight of methyl ethyl ketone and xylene to give a 40% strength solution. Thereafter the solution was applied to an iron sheet and first cured for 2 hours at 80° C. and then for 3 hours at 140° C. A colourless coating of high gloss and hardness as well as good adhesion to the substrate was obtained.

(b) The precondensate (B-stage) manufactured in Example 1 was first stored at room temperature for 14 months and subsequently used for the coating of an iron sheet according to Example III (a). The product proved to be perfect both in respect of solubility and flow and also in respect of the properties of the cured coatings. This shows the high storage stability of the precondensates (B-stages) according to the invention.

Example IV

The precondensate (B-stage) manufactured in Example 10 was warmed to 140° C. after 10 days storage at room temperature, and poured into moulds prewarmed to 160° C. (sheets of size 14 x 14 x 0.4 cm.) and subjected to a heat treatment of 16 hours at 140° C. The cured shaped articles had the following properties:

flexural strength according to VSM 77,103=8.5 kg./mm.²
water absorption after 24 hours at 20° C.=0.04%
tracking resistance according to VDE 0303=KA3c Example V 500 g. of the precondensate (B-stage) manufactured according to Example 7 were powdered by means of a beater mill to a particle size of less than 3 mm. and thoroughly mixed with 250 g. of TiO₂ in a mixer for 15 minutes. The mixture was homogenised in an extruder (Buss Co-Kneader PR 46) at 90° C. jacket temperature within about 4 minutes, cooled, coarsely ground in a beater mill and finely ground in a pin mill and sieved through a 100μ sieve. The powder was applied to iron sheet by means of an electrostatic spraying plant (of Messrs. Sames) and then cured for 60 minutes in an oven at 180° C. A hard, well-adhering, white highly glossy coating resulted which in contrast to conventional cured epoxide resin coatings based on diomethane-diglycidyl-ether practically does not yellow on ultraviolet irradiation. The curing time of the coating can be shortened by adding an appropriate amount of accelerator.

We claim:
1. A new storage-stable, heat-curable soluble and fusible normally solid precondensate based on polyepoxide compounds, acid polyesters and anhydride curing agents, which is obtained by warming a mixture of (1) a polyepoxide with at least one carbocyclic or heterocyclic ring, (2) a polycarboxylic acid anhydride with at least one carbocyclic ring in an amount of 0.8 to 0.2 equivalent per 1 epoxide equivalent of the polyepoxide (1), and (3) an acid polyester, containing in its structure carbocycles or heterocycles, of formula

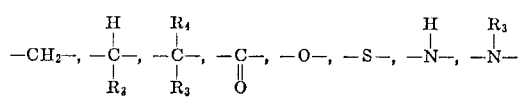

in an amount of 0.2 to 0.8 equivalent per 1 epoxide equivalent of the polyepoxide (1), in the temperature range of 50° to 160° C. whilst avoiding gelling, wherein, in the formula, the symbols $R_1$ and $R_2$ denote divalent aliphatic, araliphatic, cycloaliphatic, cycloaliphatic-aliphatic, aromatic or heterocyclic residues, with the proviso that at least one of the two residues $R_1$ and $R_2$ must contain a carbocycle or heterocycle, wherein $n$ denotes an integer having a value of 2 to 10, and wherein furthermore the quotient $Z_g/Z_r$ in the recurring structural element of formula

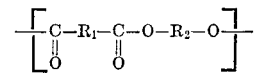

has a value of 2 to 13, $Z_g$ denotes the total number of members in the straight chain of the structural element and $Z_r$ denotes the number of members of the structural element consisting of a cycle with the former members $Z_g$ being selected from the following group:

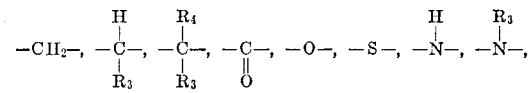

($R_3$ and $R_4$ each denote an alkyl or alkenyl group), alicycle, heterocycle and aromatic cycle with the proviso that a cycle in which two rings are linked by a common spiro-carbon atom is counted as two members.

2. A new storage-stable, heat-curable soluble and fusible nomally solid precondensate based on polyepoxide compounds, acid polyesters and anhydride curing agents, which is obtained by warming a mixture of (1) a polyepoxide with at least one carbocyclic or heterocyclic ring, (2) a polycarboxylic acid anhydride with at least one carbocyclic ring in an amount of 0.3 to 0.45 equivalent per 1 epoxide equivalent of the polyepoxide (1), and (3) an acid polyester, containing in its structure carbocycles or heterocycles, of formula

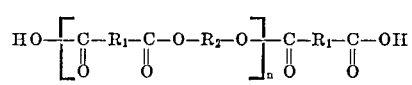

in an amount of 0.3 to 0.55 equivalent per 1 epoxide equivalent of the polyepoxide (1), in the temperature range of 50° to 160° C. whilst avoiding gelling, wherein, in the formula, the symbols $R_1$ and $R_2$ denote divalent aliphatic, araliphatic, cycloaliphatic, cycloaliphatic-aliphatic, aromatic or heterocyclic residues, with the proviso that at least one of the two residues $R_1$ and $R_2$ must contain a carbocycle or heterocycle, wherein $n$ denotes an integer having a value of 2 to 5, and wherein furthermore the equotient $Z_g/Z_r$ in the recurring structural element of formula

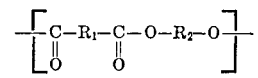

has a value of 4 to 10, $Z_g$ denotes the total number of members in the straight chain of the structural element and $Z_r$ denotes the number of members of the structural element consisting of a cycle with the former members $Z_g$ being selected from the following group:

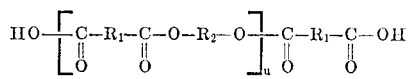

($R_3$ and $R_4$ each denote an alkyl or alkenyl group), alicycle, heterocycle and aromatic cycle with the proviso that a cycle in which two rings are linked by a common spiro-carbon atom is counted as two members.

3. A precondensate according to claim 1 which contains a polyepoxide (1) which on curing with the carboxylic acid anhydride (2) alone yields a cured moulded material with a heat distortion point according to Martens DIN 53,458 of at least 140° C.

4. A precondensate according to claim 1 which contains a cycloaliphatic or heterocyclic polyepoxide compound as the polyepoxide (1).

5. A precondensate according to claim 4 which contains a diepoxide of formula

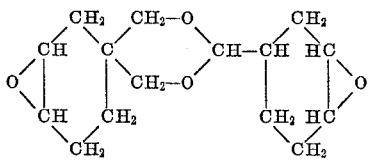

6. A precondensate according to claim 4 which contains tetrahydrophthalic acid diglycidyl ester or hexahydrophthalic acid diglycidyl ester.

7. A precondensate according to claim 4 which contains triglycidyl isocyanurate.

8. A precondensate according to claim 4 which contains N,N′-diglycidyl-5,5-dimethyl-hydantoin.

9. A precondensate according to claim 1, which contains a polycarboxylic acid anhydride (2) which on reaction with the polyepoxide (1) alone yields a cured moulded material with a heat distortion point according to Martens DIN 53,458 of at least 140° C.

10. A precondensate according to claim 1 which contains a cycloaliphatic polycarboxylic acid anhydride.

11. A precondensate according to claim 1 which contains an acid polyester (3) which is derived from tetrahydrophthalic acid or hexahydrophthalic acid.

12. A precondensate according to claim 1 which contains an acid polyester (3) which is derived from phthalic acid.

13. A precondensate according to claim 1 which contains an acid polyester (3) which is derived from succinic acid.

14. A precondensate according to claim 1 which contains an acid polyester (3) which is derived from 1,1-bis - (hydroxymethyl)cyclohexane or 1,1 - bis(hydroxymethyl)cyclohexene.

15. A precondensate according to claim 1 which contains an acid polyester (3) which is derived from ethylene glycol, propanediol-1,2 or propanediol-1,3- butanediol-1,4 or neopentylglycol.

16. A precondensate according to claim 1 which contains an acid polyester (3) which is derived from 2,2-bis(p-hydroxycyclohexyl)-propane.

References Cited
UNITED STATES PATENTS

| | | | |
|---|---|---|---|
| 3,027,279 | 3/1962 | Kurka et al. | 260—835 |
| 3,280,077 | 10/1966 | Case et al. | 260—835 |
| 3,408,421 | 10/1968 | Kurka | 260—835 |
| 3,427,255 | 2/1969 | Case | 260—835 |
| 3,523,143 | 8/1970 | Kwong | 260—835 |

JOHN C. BLEUTGE, Primary Examiner

U.S. Cl. X.R.

117—126 GR; 260—22 EP, 28, 32.8 EP, 33.2 EP, 33.4 EP, 33.6 EP, 40 R, 75 EP, 830 TW, 836